(12) United States Patent
Moliere et al.

(10) Patent No.: US 9,058,574 B2
(45) Date of Patent: Jun. 16, 2015

(54) METHOD FOR ESTIMATING THE LIFESPAN OF A DEEP-SUB-MICRON INTEGRATED ELECTRONIC CIRCUIT

(75) Inventors: Florian Moliere, Paris (FR); Bruno Foucher, Chatillon Sous Bagneux (FR)

(73) Assignee: EUROPEAN AERONAUTIC DEFENCE AND SPACE COMPANY EADS FRANCE, Paris (FR)

( * ) Notice: Subject to any disclaimer, the term of this patent is extended or adjusted under 35 U.S.C. 154(b) by 588 days.

(21) Appl. No.: 13/381,112

(22) PCT Filed: Jun. 30, 2010

(86) PCT No.: PCT/EP2010/059317
§ 371 (c)(1),
(2), (4) Date: Feb. 22, 2012

(87) PCT Pub. No.: WO2011/000888
PCT Pub. Date: Jan. 6, 2011

(65) Prior Publication Data
US 2012/0143557 A1    Jun. 7, 2012

(30) Foreign Application Priority Data
Jul. 1, 2009   (FR) .................................. 09 54496

(51) Int. Cl.
G06F 19/00   (2011.01)
G06Q 10/06   (2012.01)
G06F 17/50   (2006.01)
G01R 31/28   (2006.01)

(52) U.S. Cl.
CPC ............ *G06Q 10/06* (2013.01); *G06F 17/5036* (2013.01); *G06F 17/5081* (2013.01); *G06F 2217/82* (2013.01); *G01R 31/2855* (2013.01)

(58) Field of Classification Search
CPC ............... G06Q 10/06; G01R 31/2855; G06F 17/5036; G06F 2217/82; G06F 17/5081
USPC .............. 702/117, 182, 184; 703/2, 6, 13, 14; 716/136; 324/762.01
See application file for complete search history.

(56) References Cited

U.S. PATENT DOCUMENTS 5,600,578 A * 2/1997 Fang et al. ...................... 703/14
5,606,518 A * 2/1997 Fang et al. ...................... 703/13
(Continued)

FOREIGN PATENT DOCUMENTS

JP      2006 277370      10/2006

OTHER PUBLICATIONS

International Search Report dated Oct. 27, 2010, corresponding to PCT/EP2010/059317.
(Continued)

*Primary Examiner* — Carol S Tsai
(74) *Attorney, Agent, or Firm* — Young & Thompson

(57) ABSTRACT

A method for estimating the lifetime of a deep-submicron-generation integrated electronic component, linked to a wear mechanism occurring in previously defined special conditions of use, said component being of a deep submicron type, with very large-scale integration, commercially available off the shelf, wherein one assumes that the same sample population always experiences a failure due to: the most predominant failure mechanism, during the period of useful life, described by an exponential law, and the most critical wear mechanism, represented by a Weibull distribution at the end of the previous period.

8 Claims, 4 Drawing Sheets

(56) References Cited

U.S. PATENT DOCUMENTS

| | | | |
|---|---|---|---|
| 6,873,932 B1* | 3/2005 | Kim | 702/182 |
| 6,961,687 B1* | 11/2005 | Myers et al. | 703/6 |
| 7,260,509 B1 | 8/2007 | Brand | |
| 7,457,725 B1 | 11/2008 | Civilini | |
| 7,808,266 B2* | 10/2010 | Marsall et al. | 324/750.14 |
| 8,290,753 B2* | 10/2012 | Tryon et al. | 703/2 |
| 2003/0066036 A1 | 4/2003 | Mau | |
| 2006/0206246 A1* | 9/2006 | Walker | 701/16 |
| 2007/0061021 A1* | 3/2007 | Cohen et al. | 700/30 |
| 2007/0061184 A1* | 3/2007 | Clark | 705/9 |
| 2008/0015827 A1* | 1/2008 | Tryon et al. | 703/2 |
| 2008/0077376 A1 | 3/2008 | Belhaddad et al. | |
| 2008/0177613 A1* | 7/2008 | Chan et al. | 705/9 |
| 2008/0298964 A1* | 12/2008 | Rimmen | 416/39 |
| 2009/0046405 A1* | 2/2009 | Ichikawa | 361/103 |
| 2010/0019084 A1* | 1/2010 | Sisk | 244/1 R |
| 2010/0164533 A1* | 7/2010 | Marshall et al. | 324/769 |

OTHER PUBLICATIONS

W. Burleson, et al.; "Trading Off Transient Fault Tolerance and Power Consumption in Deep Submicron (DSM) VLSI Circuits"; IEEE Transactions on Very Large Scale Integration (VLSI) Systems, IEEE Service Center, vol. 12 No. 3; pp. 299-311; Mar. 1, 2004.

\* cited by examiner

METHOD FOR ESTIMATING THE LIFESPAN OF A DEEP-SUB-MICRON INTEGRATED ELECTRONIC CIRCUIT

BACKGROUND OF THE INVENTION AND PROBLEM STATEMENT

The present invention belongs to the field of electronic component manufacturing processes. It relates more specifically to a method for selecting electronic components, in particular deep submicron semiconductors.

With technological advances in miniaturization and the introduction of new materials, predicting the lifetime and failure rate of deep submicron (DSM) semiconductors has acquired great importance.

Integrated circuit manufacturers manage these problems based on goals of low cost and high performance for the mass market, with a component lifetime criterion of 10 years in use (operating conditions, 0.1% cumulative failures, 90% confidence). This approach does not satisfy the requirements for long-term high reliability and lifetime encountered in professional electronic systems such as aeronautics, space, defense, health, transport, energy or industrial installations.

The following table presents the example of long-term reliability required in the aerospace and energy industries:

| Application | Requirements for the equipment | |
| --- | --- | --- |
| | Failure rate | Lifetime |
| Space satellite | 10 FITs | 15 years |
| Civil avionics | 100 FITs | 30 years |
| Nuclear power plant | 10-100 FITs | 60 years |

In most of these applications, these failure rates and lifetime specifications are achieved through redundancy of the printed circuits and equipment.

However, any solution must be based on knowledge of the component's failure rate in relation to the mission's profile and the assurance of a fairly good level of reliability. With this knowledge, the necessary redundancy can be prepared so that a failure rate and lifetime margin can be obtained which respect the specifications of the equipment in question.

Today it is envisaged to use a large range of commercial off-the-shelf ("COTS") deep-submicron-generation components in their design. The main advantages of these components compared to specific components are their high performance levels and low price, but their reliability in severe environments is still questionable.

Generally, the components' qualification reports and technical data sheets provided by the integrated circuit manufacturers are used to estimate the components' failure rate, in use, based on Accelerated Tests (AT) and Acceleration Factors (AF).

The accelerated tests are carried out at the component level and are generally mentioned in the manufacturer's qualification report.

The activation energy depends on the failure mechanism and the degradation models. The failure mechanism is determined by the technological and design choices. Thus, choosing a small gate length with a SiON gate oxide will favor a charge injection mechanism in the gate. Taking a default activation energy can result in a greatly distorted estimate of the component's reliability. For example, an overestimated activation energy in an acceleration factor leads to an underestimation of the failure rate in use.

Integrated circuit manufacturers rarely take into account environmental conditions, long-term use and other parameters linked to professional electronics, because these parameters do not concern products intended for the mass market. In these severe conditions, a factor of 4 can even be obtained for commercial off-the-shelf ("COTS") components (FIG. 1 and FIG. 2).

As a result, knowledge of acceleration factor models and parameters based on the technology is essential for estimating reliability.

Unfortunately, professional electronics are only a very small market for circuits with very large-scale integration ("VLSI") and information is not available for these markets. To overcome this problem a dedicated reliability analysis at the silicon level must be performed for each electronic component in order to collect basic information and build a reliability prediction.

An initial step of the method consists of gathering basic information about the component: manufacturer, foundry and if possible data relating to the manufacturing process and the technology.

When the required information is not available in the literature, the component is studied using a process of reverse engineering at the silicon level.

The research is carried out to draw up the component's identity card with regard to the final foundry steps ("Back End Of Line"—BEOL) and initial foundry steps ("Front End Of Line"—FEOL), where at least the following information is extracted:

The technological generation or node (half-step parameter),
Number of metal layers, materials and dimensions of the metallization and interconnections,
Transistor material and dimensions,
Substrate type (Silicon on insulator or "massive bulk" silicon).

A next step consists of analyzing the component's sensitivity relative to its mission profile, such as the examples of aeronautics mission profiles illustrated in the following table.

| Profile example | Use | |
| --- | --- | --- |
| | Storage | Application |
| 1 | 10% operating cycle 25° C. no polarization no assembly | 90% operating cycle 25/70° C., $V_{DD}$ |
| 2 | 99% operating cycle 25° C. no polarization assembled | 1% operating cycle −55/125° C., $V_{DD}$ |

These profiles must be taken into account when estimating reliability.

For example, compared to operational situations the emergence of failure mechanisms activated by the voltage, such as electromigration and the burnout of the gate oxide, are unlikely in non-powered storage conditions.

Regardless of the mission profile, some materials and architectures are known to be more sensitive to certain mechanisms. For example, the porosity of low-k oxide makes it easier for the oxide of the inter-layer dielectric (ILD) to fail. In addition, during the BEOL step there are large variances between the thermal expansion coefficients of the copper in double damascening, of the diffusion layer and of the dielectric oxides of the intermediate layer, which makes the technology more sensitive to damage by migration under constraints.

In Silicon On Insulator (SOI) technology, the insulator layer prevents dissipation by Joule effect to spread through the substrate, which induces a thermal acceleration of the silicon's failure mechanisms.

On the other hand, for the same gate length the consumption of dynamic power is lower in SOI technology than in bulk substrates, which offsets these thermal weaknesses.

Finally, gate oxides with high permittivity values seem to be more sensitive to the instability mechanisms of the threshold voltage in temperature than the traditional SiON oxide, due to a greater physical thickness, a larger number of interfaces and the initial presence of mobile charges in the oxide.

The sensitivity analysis provides an indication of the silicon's failure mechanisms that are the most likely to occur.

By elimination the predominant mechanisms to be studied are selected, as well as the qualification report tests that must be the subject of a subsequent analysis.

The predominant failure mechanisms of the circuits also provide information about the time dependency of the failure. Some of these are typical of the bottom of the reliability bath curve and some others are defined as wear-out mechanisms (FIG. 3).

In the first case, the reliability is best described by a constant instantaneous failure rate (designated by A and expressed in FITs—"Failure in Time"), whereas for the mechanism of failure by wear-out, it is the lifetime that is talked of instead: "Time to Failure" (TTF) in hours, the time at which the probability of failure F(t) reaches the specified value, e.g. $10^{-7}$ or $10^{-9}$ for some aeronautical applications.

Manufacturers of integrated circuits generally deduce an instantaneous failure rate from a high-temperature operating life (HTOL) test through the $\chi^2$ estimator.

The main advantage of this estimator is to extrapolate a failure rate from a small sample to a large quantity of components with a known confidence coefficient (FIG. 4). This method is still acceptable for the failure mechanism occurring when the failure rate is constant and independent of the duration of the test.

However, this calculation is no longer suitable for wear mechanisms, simply because the failure rate increases with time.

OBJECTIVES OF THE INVENTION

The objective of this invention is therefore to propose a method responding to the problem outlined above.

DESCRIPTION OF THE INVENTION

To remedy this problem, the invention envisages a Method for estimating the lifetime ($TTF_{APPLI}$) of a deep-submicron-generation integrated electronic component, linked to a wear mechanism occurring in previously defined special conditions of use, said component being of a deep submicron type, with very large-scale integration (VLSI), commercially available off the shelf, characterized in that it is assumed that the same sample population always experiences a failure due to the following two mechanisms:
 a failure mechanism, the most predominant during the period of useful life, described by an exponential law,
 a wear mechanism, the most critical, represented by a Weibull distribution at the end of the previous period,
 and in that the method comprises the following steps:

Step 101—of receiving and storing predefined elements of technical information about the component, in particular the power supply voltage(s), technological data (node, FEOL and BEOL description), the technical description of the encapsulation and the addressing data for the component, Step 106—of analyzing the component's sensitivity with regard to specific conditions of use, Step 116—of selecting the most probable bottom of the bath and wear mechanisms, and associated accelerated tests.

According to various advantageous implementations, possibly used in conjunction, the method comprises the following steps in addition:

Step 109—of calculating the rate of failures ($\lambda_{TEST}$), based on the results of the accelerated tests on the component's lifetime, Step 111—of calculating an estimated lifetime for the component in test conditions ($TTF_{TEST}$), Step 112—of determining an acceleration factor used for analyzing the results of at least one accelerated test of the component in relation to the latter's technology and the mission profile.

Step 108—of acquiring and storing the results of at least one accelerated test of the component's lifetime, if such test results are not available; the type of test is chosen according to a mechanism of failure by wear. In this step, for the failure mechanisms such as those known under the names HCl, NBTI and EM, and in order to take the fastest components into account, the test bench comprises a means of very local heating/cooling of the component.

Step 103—of studying the component using a process of reverse engineering, so as to determine, in particular, the technological data of the component at the level of the component's housing, the BEOL and FEOL parameters.

Step 105—of establishing an identity card for the component according to a series of predefined criteria (technology, failure mechanisms inherent in the technology, etc.).

Step 102—of characterizing environmental data corresponding to the specific conditions of use planned for the component, in particular the electrical and thermal mission profile.

Step 110—of identifying failure mechanisms observed at the time of failures under test conditions.

Advantageously, in Step 111:
 the probability of failures is described by a bimodal distribution (Eq. 1) in which $\lambda_{TEST}$ is the failure rate under test conditions, $TTF_{TEST\_R\%}$ the mean value of the time to failure for components that have survived after $t=t_{TEST}$ and $\beta$ the Weibull slope of the wear mechanism:

$$F_{component}(t) = \begin{cases} 1 - e^{-\lambda_{test} \cdot t} & \text{if } t_{0\%} \le t \le t_{test} \\ 1 - e^{-\left(\frac{t}{TTF_{test-R\%}}\right)^{\beta}} & \text{if } t_{test} \le t \le t_{100\%} \end{cases} \quad (1)$$

the most unfavorable case is considered, in which the most critical failure mechanism occurs just after the test period, because of the continuity of the two distributions, resulting in there being the same probability of the component's failure described by the exponential law and by the Weibull distribution, and therefore in $TTF_{TEST\_R\%}$ being calculated by (Eq. 2):

$$TTF_{TEST\_R\%} = \frac{(t_{TEST})^{1-\frac{1}{\beta}}}{\lambda_{TEST}^{\frac{1}{\beta}}} \quad (2)$$

the mean time to failure $TTF_{TEST}$ is thus calculated for all the mechanisms of failure by wear studied, with relevant Weibull slopes, typical of each wear mechanism; their value is chosen according to the technological analysis.

More specifically, in this case, the method also includes a step:

Step 113, 114—of calculating the effective failure rates $\lambda_{APPLI}$ and lifetime $TTF_{APPLI}$ in use, according to the acceleration factor $AF_i$ specific to mechanism i, from the failure rate $\lambda_{TEST}$ and lifetime $TTF_{TEST}$ measured during the accelerated tests, by applying the formulas:

$$\lambda_{APPLICATION} = \frac{\lambda_{TEST}}{AF_i} \quad (3)(4)$$

$$TTF_{APPLICATION} = TTF_{TEST\_R\%} \cdot AF_i$$

BRIEF DESCRIPTION OF THE FIGURES

The goals and advantages of the invention will be better understood in reading the description and drawings of a particular embodiment, given as a non-limiting example, for which the drawings show.

DETAILED DESCRIPTION OF AN EMBODIMENT OF THE INVENTION

The following description of the method for calculating the reliability of deep submicron components is presented over several technologies.

The method as described is notably intended to be implemented automatically by a suitable electronic device.

The goal of the method is to estimate a life span for a deep-submicron-generation integrated component, based on the calculation of the failure rate provided by the manufacturer.

It is assumed that the same sample population always experiences a failure due to:

the most predominant mechanism during the period of useful life, described by an exponential law, the most critical wear mechanism, represented by a Weibull distribution at the end of the previous period.

As a result, the probability of failures can be described by a bimodal distribution (1) in which $\lambda_{TEST}$ is the failure rate under test conditions, $TTF_{TEST\_R\%}$ the mean value of the time to failure for components that have survived after $t=t_{TEST}$ and $\beta$ the Weibull slope of the wear mechanism.

$$F_{component}(t) = \begin{cases} 1 - e^{-\lambda_{test} \cdot t} & \text{if } t_{0\%} \leq t \leq t_{test} \\ 1 - e^{-\left(TTF_{test-R\%}\right)^{\beta}} & \text{if } t_{test} \leq t \leq t_{100\%} \end{cases} \quad (1)$$

Figure 1:
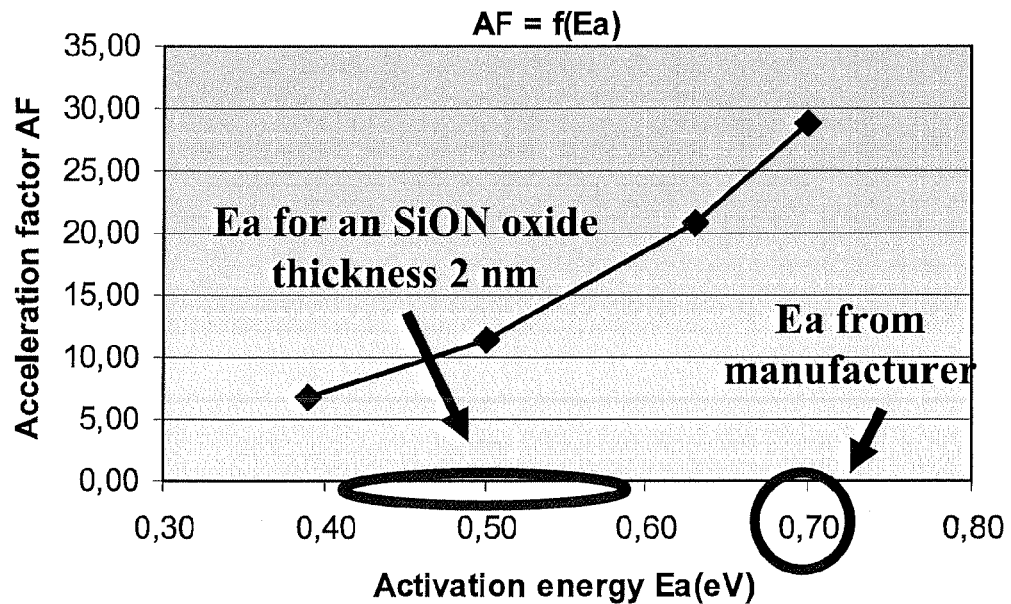
FIG. 1 (already mentioned): FPGA acceleration factor between the rate of failures in use and the rate of failures in test conditions for different activation energies for the TDDB ("Time Dependent Dielectric Failure": time-based burnout of the dielectric) failure mechanism of the gate oxide (2 nm thick SiON gate oxide), FIG. 2 (already mentioned): FPGA failure rate under conditions of use for different activation energies for the TDDB failure mechanism of the gate oxide (2 nm SiON gate oxide), FIG. 3 (already mentioned): bath curve of the failure rate and failure mechanisms of silicon, FIG. 4 (already mentioned): methodology for estimating the failure rate (according to the state of the art)
Figure 2:
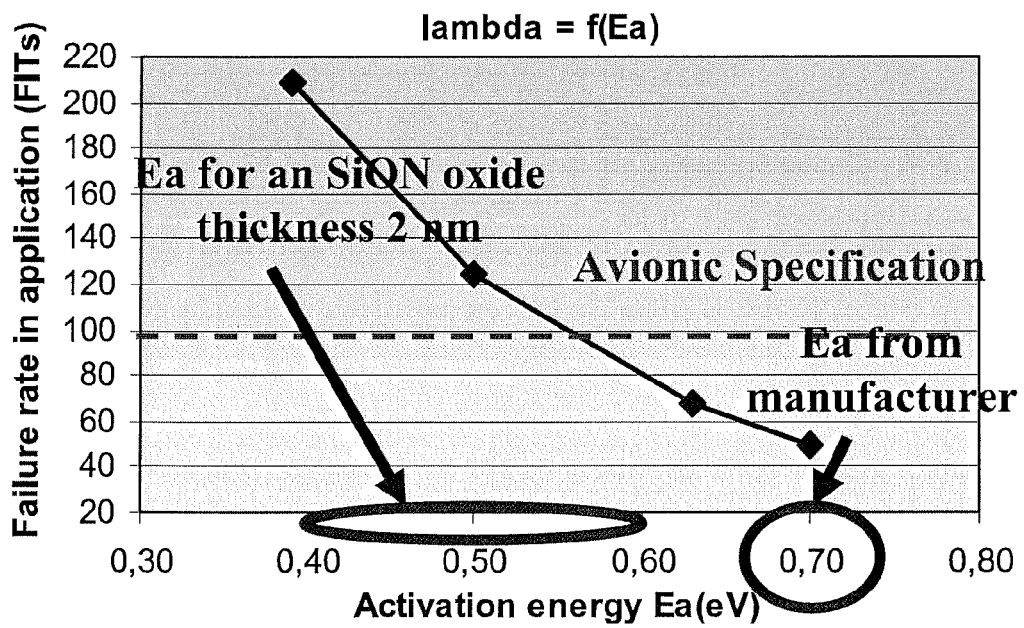
Figure 3:
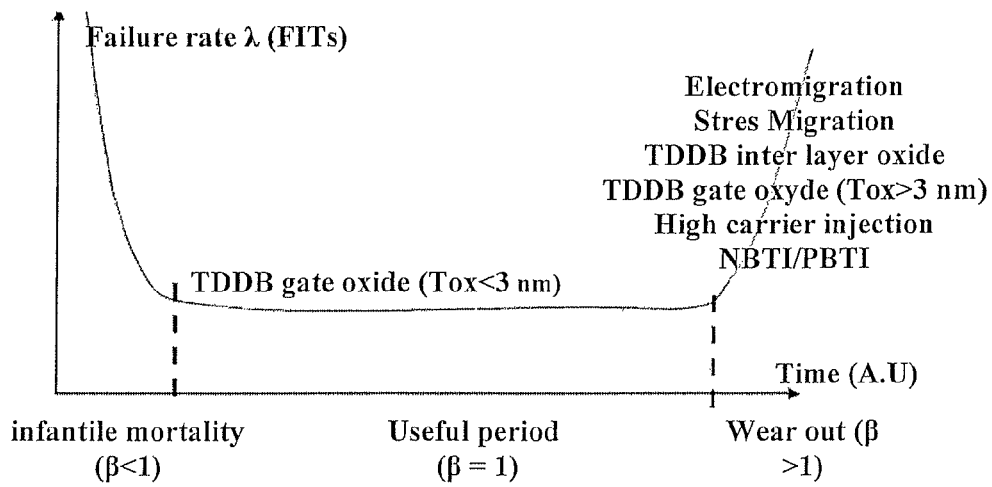
Figure 4:
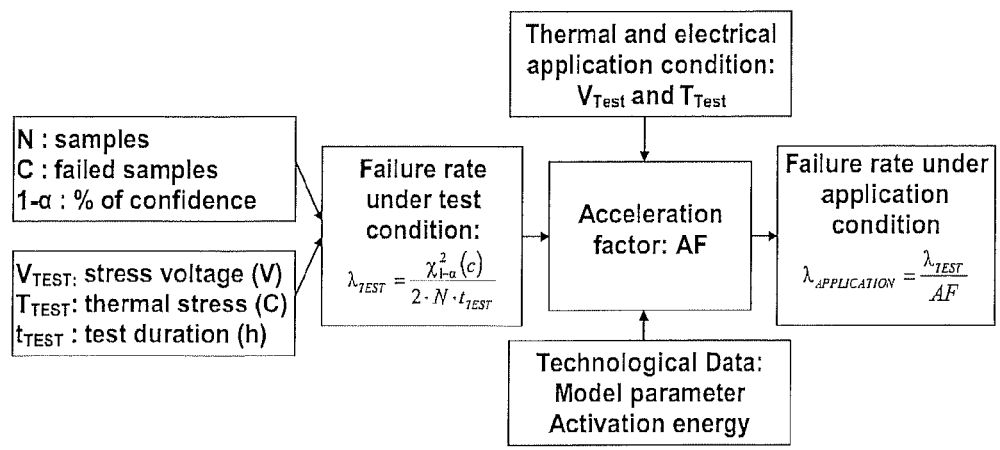
Figure 5:
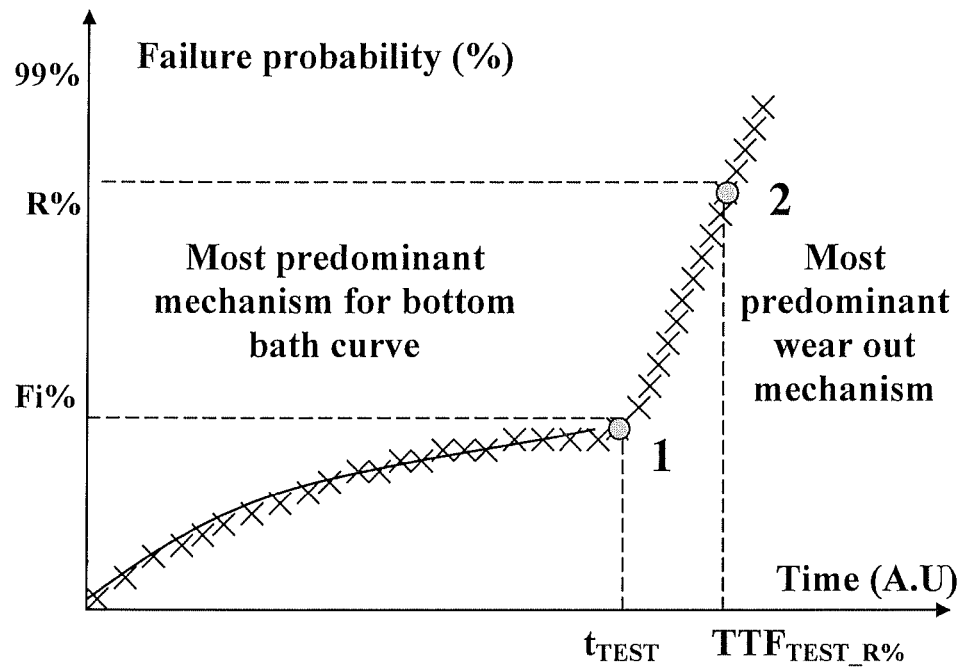
FIG. 5: probability of failures of the component as a function of time.

The most unfavorable case is also considered, in which the most critical failure mechanism occurs just after the test period. Indeed, at the intersection of the two distributions (point 1 in FIG. 5) there is the same probability of failure of the component described by the exponential law and by the Weibull distribution.

By continuity, the following can be expressed:

$$TTF_{TEST\_R\%} = \frac{(t_{TEST})^{1-\frac{1}{\beta}}}{\lambda_{TEST}^{\frac{1}{\beta}}} \quad (2)$$

A time to fail is thus calculated for all the mechanisms of failure by wear studied, with relevant Weibull slopes. The Weibull slope is typical of a wear mechanism.

It depends on the technology, such that its value is chosen according to the technological analysis.

A good estimate of the lifetime and the failure rate depends on the accuracy of the acceleration factor.

For a given silicon failure mechanism, the literature contains various models generally linked to the generation node and the polarization.

For example, the gate oxide's burnout time can be modeled according to four degradation laws:

Model E is used for an application with a low electrical field,

Models 1/E and $E^{0.5}$ are used for a high electrical field;

The voltage power law is associated with a behavior not conforming to the Arrhenius law in temperature for a gate oxide less than 3 nm thick.

In addition, the material and the dimensions of scale have implications for the choice of the model's parameters. For example, the activation energy of the gate oxide's burnout mechanism will be different for the oxides in silicon ($SiO_2$), nitrided oxides (SiON) and oxides with a high permittivity value.

As a result, estimating the failure rate and the lifetime entails first of all knowing the physical aspects of the failure involved and then, for a specific failure mechanism, setting up a large database of acceleration factor data and models with all the appropriate parameters that cover the entire variety of deep submicron components.

The effective failure rates and lifetime in use are then calculated with the factor $AF_i$ specific to mechanism i, from the failure rate and lifetime measured during accelerated tests (Eq. 3).

$$\lambda_{APPLICATION} = \frac{\lambda_{TEST}}{AF_i} \qquad (3)(4)$$

$$TTF_{APPLICATION} = TTF_{TEST\_R\%} \cdot AF_i$$

Figure 7:
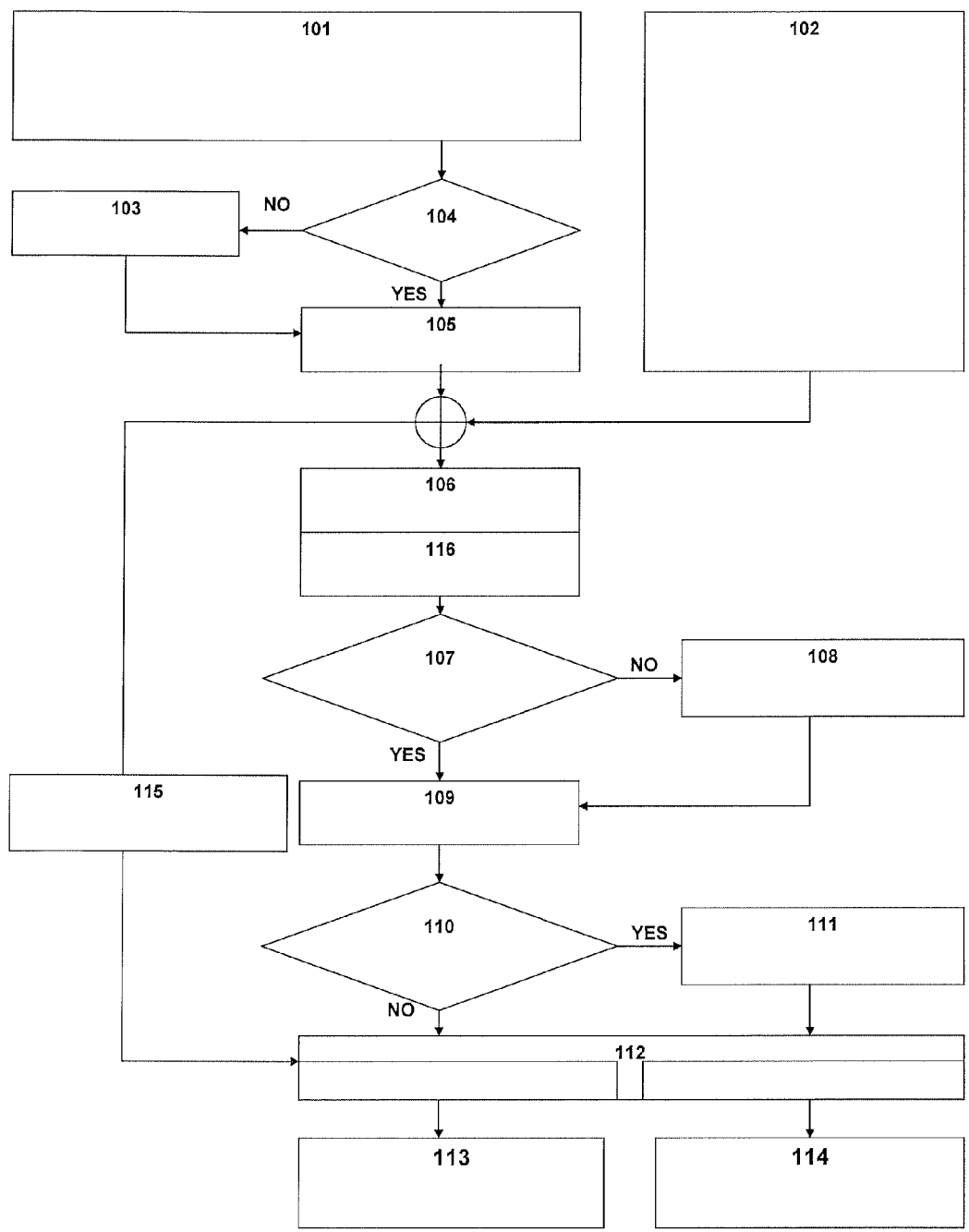
FIG. 7: methodology for estimating the failure rate in a method as described.

The methodology used in the method for estimating the failure rate as described is illustrated in FIG. 7.

As seen in this figure, the method comprises the following steps:

step 101—of receiving and storing predefined elements of technical information about the component, in particular the power supply voltage(s), technological data (node, FEOL and BEOL description) and the addressing data for the component, step 102—of characterizing environmental data corresponding to the specific conditions of use planned for the component, in particular the electrical and thermal mission profile.

step 104—of determining whether the technical data received in step 101 are sufficient, in particular for determining a theoretical failure rate, and if not:

step 103—of studying the component using a process of reverse engineering, so as to determine, in particular, the technological data of the component at the level of the component's housing, the BEOL and FEOL parameters.

Then a step 105—of establishing an identity card for the component according to a series of predefined criteria (technology, failure mechanisms inherent in the technology, etc.).

The results of this step 105 and step 102 are used as input in a step 115—of selecting a model of damage for the component and its parameters, and simultaneously in a step 106—of analyzing the component's sensitivity with regard to special conditions of use.

This step 106 allows the most effective bottom of the bath and wear mechanisms, and associated accelerated tests, to be selected in a step 116.

In a step 107, it is determined whether the results of accelerated tests as determined in step 116 are available, if not, in a step 108, tests to be operated on the user's side for spotlighting the mechanisms sought, if such test results are not available in the manufacturer's qualification report, are determined and implemented.

Then in a step 109 the failure rate ($\lambda_{TEST}$) is calculated, based on the results of the accelerated tests of the component's lifetime.

In a step 110 the failure mechanisms observed at the time of failures under test conditions are identified.

If the mechanism is a wear mechanism, the continuity of the failure function is used, and in a step 111 an estimated lifetime of the component in test conditions ($TTF_{TEST}$) is calculated.

Then in a step 112 the acceleration factors used to analyze the results of the accelerated test for the component is determined.

Finally, in steps 113 (for a bottom of the bath curve mechanism) and 114 (for a wear mechanism), the effective failure rate $\lambda_{APPLI}$ and lifetime $TTF_{APPLI}$ in use are calculated, according to the appropriate acceleration factor AF, from the failure rate $\lambda_{TEST}$ and lifetime $TTF_{TEST}$ measured during the accelerated tests, by applying equations 3 and 4.

Example of Application

The interest of such an approach is demonstrated by an example of application with two similar components of the same technological generation and from two different foundries.

The components are called A and B.

The two components are subject to an avionics type of mission profile, in this case 3 years storage, not powered, at 25° C., then during 30 years, a junction temperature of 70° C., powered at 3.3 V twelve hours a day.

The failure mechanism studied is a mechanism by wear, the electromigration in interconnections of the final foundry steps ("BEOL").

First, information is collected about the manufacturing processes of the foundries where the components were manufactured.

The information available from the foundries is not sufficient and a destructive physical analysis is carried out to obtain the required data.

The two components have the same foundry BEOL steps, with 3 layers of metallization and exactly the same interconnections dimension. However, component A has interconnections made of aluminum whereas component B is manufactured in copper with the help of a double damascene method.

These data are collected in the following table.

|  | Component | |
| --- | --- | --- |
|  | A | B |
| Number of layers of metallization | 3 | 3 |
| Nature of the metallization | 2 Al | 2 Cu |
|  | 1 TiW | 1 TiW |
| Nature of the interconnection holes | W | Cu |
| Diffusion layer | Ti/TiN | Ta/TaN |
| Cap | $SiN_x$ | $SiN_x$ |
| Intermediate layer oxide | $SiO_2$ | Low permittivity oxide |

Considering the mission profile, no risk was detected in the storage situation (component not powered).

However, a reliability risk located in the $3^{rd}$ level has been identified for component A.

The metallization width is close to 2 µm and as a result creates a rapid diffusion path through the border of the grains, which can induce a migration of metal grains in a polarization state.

For this failure mechanism, a high-temperature lifetime test of the oxide was carried out on 87 samples of component A and 87 samples of component B during 2000 hrs, at 125° C. (junction) and 3.96 V.

No failure was observed during the tests. The maximum failure rate under the test conditions can be calculated by equation 5, assuming a 60% confidence level.

$$\lambda_{TEST} = \frac{\chi^2_{1-\alpha}(2c+2)}{2 \cdot N \cdot t_{TEST}} \qquad (5)$$

$$\lambda_{TEST} = 5300 \; FITs$$

The probability of failure after the test conditions of the test is close to 1%.

This indicates that 99% of the 87 samples could break down through the electromigration mechanism; this value will be taken into consideration for calculating the lifetime. Assuming a Weibull slope of 6 for the structure Al/Ti/TiN/$SiO_2$, the average time to failure ("TTF") taking the test conditions into account can be estimated by equation 6:

$$TTF_{TEST\_R\%} = \frac{(t_{TEST})^{1-\frac{1}{\beta}}}{\lambda_{TEST}^{\frac{1}{\beta}}} = \frac{(2000)^{1-\frac{1}{6}}}{(5,3 \cdot 10^{-6})^{\frac{1}{6}}} \approx 4300\ h \quad (6)$$

The most representative acceleration factor for the electromigration test is the Black model.

This model emphasizes the influence of the power supply voltage through the current density expressed by a power law and the impact of the temperature with an Arrhenius model (Eq. 7).

$$TTF = A \cdot J^{-n} \cdot e^{\frac{E_A}{kT}} \quad (7)$$

TTF is the time to failure, A is a constant, J is the current density, $E_A$ is the activation energy, k is the Boltzmann constant and T is the temperature.

In addition, the relationship between the electrical power supply and the current density can be expressed by equation 8.

Parameter f is the frequency (Hz), $\in_0$ is the dielectric constant in a vacuum, $\in_{ox}$ is the dielectric constant of the oxide, $V_{DD}$ is the voltage of the power supply and d is the minimum pitch between the metallizations.

$$J = f \cdot \varepsilon_0 \cdot \varepsilon_{ox} \cdot \frac{V_{DD}}{d} \quad (8)$$

According to (7) and (8), the acceleration factors for the two components can be obtained by equation 9:

$$AF = \left(\frac{V_{appli}}{V_{test}}\right)^{-n} \cdot e^{\frac{Ea}{k}\left(\frac{1}{T_{test}} - \frac{1}{T_{appli}}\right)} \quad (9)$$

and the parameters of the model are listed in the following table:

| Component | n | $E_A$ | AF electromigration |
|---|---|---|---|
| A | 2.02 | 0.58 | 21.7 |
| B | 1.1 | 0.89 | 80.9 |

Finally, the failure rate and the lifetime of the component can be calculated for the two components with regard to the electromigration mechanism.

The resulting reliability parameters for components A and B in the conditions of use (87 samples) are indicated in the following table:

| | 30 years, 70° C., 3.3 V, 50% op. cycle | |
|---|---|---|
| Component | $TTF_{1\%}$ (years) | $TTF_{63.2\%}$ (years) |
| A | 10 | 21 |
| B | 37 | 80 |

Figure 6:
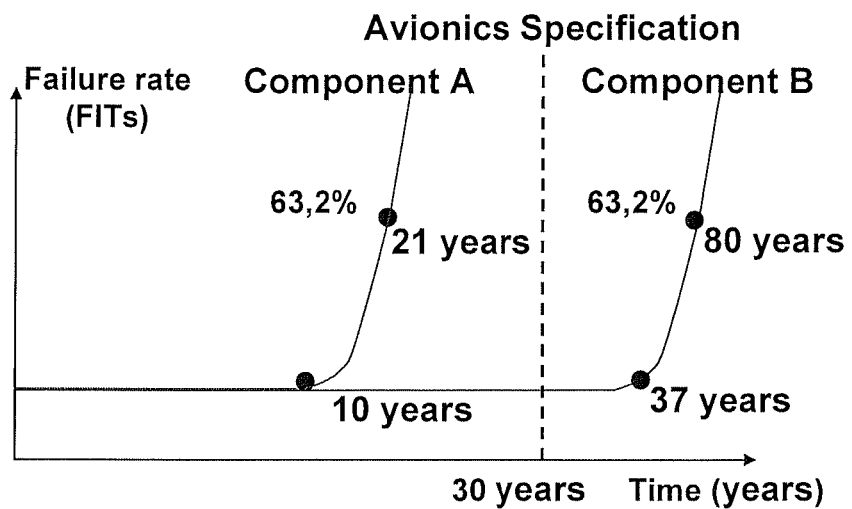
FIG. 6: component reliability bath curve for two components under conditions of use (30 years, 70° C., 3.3 V, 50% operating cycle)

Although component A and component B have the same function, the same architecture and the same generation node, it was found that component B was more suitable than component A for the avionics application described, as shown in FIG. 6.

The variation in reliability is explained by the different nature of the metallization in the area of the foundry BEOL steps.

The proposed methodology was applied for a wear mechanism: electromigration.

In order to estimate a complete reliability for the component, the same methodology must be applied for all the silicon's other failure mechanisms.

The extreme diversity of designs, manufacturing solutions and the very different mission profiles of very large-scale integration ("VLSI") circuits in professional systems cause a great divergence between the existing approaches based on standard qualification tests and the actual and extremely varied capabilities of deep submicron technologies.

This is also true for components from the same technology node.

Given that there is no standard wear for a deep submicron component and a specific mission profile, it is necessary to carry out a specific reliability analysis for each deep submicron component.

The method of the invention is based on a technological analysis which helps to identify the main failure mode and the wear mechanism.

An appropriate failure rate is deduced in order to establish a realistic prediction of the lifetime.

This new approach allows a correct choice of the accelerated test and an accurate calculation of the acceleration factor validating the lifetime prediction.

The invention claimed is:

1. A method for estimating the lifetime of a deep-submicron-generation integrated electronic component, linked to a wear mechanism occurring in previously defined special conditions of use, said component being of a deep submicron type, with very large-scale integration, commercially available off the shelf, wherein it is assumed that the same sample population always experiences a failure due to the most predominant failure mechanism, during the period of useful life, described by an exponential law, and the most critical wear mechanism, represented by a Weibull distribution at the end of the previous period, the method comprising:

receiving and storing predefined elements of technical information about the component, including the power supply voltage, technological data, a technical description of the encapsulation and the addressing data for the component, analyzing the component's sensitivity with regard to specific conditions of use, selecting the most critical bottom of the bath and wear mechanisms, and associated accelerated tests, calculating an estimated lifetime for the component in test conditions, and determining an acceleration factor used for analyzing the results of at least one accelerated test of the component, wherein, when calculating the estimated lifetime for the component in test conditions, the probability of failures is described by a bimodal distribution (Eq. 1) in which $\lambda_{TEST}$ is the failure rate under test conditions, $TTF_{TEST\_R\ \%}$ the mean value of the time to failure for components that have survived after $t=t_{TEST}$ and $\beta$ the Weibull slope of the wear mechanism:

$$F_{component}(t) = \begin{cases} 1 - e^{-\lambda_{test} \cdot t} & \text{if } t_{0\%} \leq t \leq t_{test} \\ 1 - e^{-\left(\frac{t}{TTF_{test-R\%}}\right)^{\beta}} & \text{if } t_{test} \leq t \leq t_{100\%} \end{cases} \quad (1)$$

the most unfavorable case is considered, in which the most critical failure mechanism occurs just after the test period, because of the continuity of the two distributions, resulting in there being the same probability of the component's failure described by the exponential law and by the Weibull distribution, and therefore in $TTF_{TEST\_R\%}$ being calculated by (Eq. 2):

$$TTF_{TEST\_R\%} = \frac{(t_{TEST})^{1-\frac{1}{\beta}}}{\lambda_{TEST}^{\frac{1}{\beta}}}, \quad (2)$$

and the mean time to failure $TTF_{TEST}$ is thus calculated for all the mechanisms of failure by wear studied, with relevant Weibull slopes, typical of each wear mechanism, their value is chosen according to the technological analysis.

2. The method of claim 1, further comprising acquiring and storing the results of at least one accelerated test of the component's lifetime, if such test results are not otherwise available; the type of test is chosen according to a mechanism of failure by wear.

3. The method of claim 1, further comprising studying the component using a process of reverse engineering, so as to determine a theoretical failure rate ($\lambda$).

4. The method of claim 1, further comprising establishing an identity card for the component according to a series of predefined criteria including technology and failure mechanisms inherent in the technology.

5. The method of claim 1, further comprising characterizing environmental data corresponding to the specific conditions of use planned for the component, including an electrical and thermal mission profile.

6. The method of claim 1, further comprising identifying failure mechanisms observed at the time of failures under test conditions.

7. The method of claim 1, further comprising calculating the observed failure rate $\lambda_{TEST}$ under test conditions.

8. The method of claim 1, further comprising calculating the effective failure rates $\lambda_{APPLI}$ and lifetime $TTF_{APPLI}$ in use, according to the appropriate acceleration factor AF, from the failure rate $\lambda_{TEST}$ and lifetime $TTF_{TEST}$ measured during the accelerated tests, by applying the formulas:

$$\lambda_{APPLICATION} = \frac{\lambda_{TEST}}{AF_i}$$

$$TTF_{APPLICATION} = TTF_{TEST\_R\%} \cdot AF_i.$$

\* \* \* \* \*